US007747347B2

(12) United States Patent
Park, IV

(10) Patent No.: US 7,747,347 B2
(45) Date of Patent: Jun. 29, 2010

(54) MOBILE MEDICATION STORAGE AND DISPENSING APPARATUS

(75) Inventor: William C. Park, IV, Charleston, SC (US)

(73) Assignee: Sabal Medical, Inc., Daniel Island, SC (US)

( * ) Notice: Subject to any disclaimer, the term of this patent is extended or adjusted under 35 U.S.C. 154(b) by 0 days.

(21) Appl. No.: 11/535,348

(22) Filed: Sep. 26, 2006

(65) Prior Publication Data

US 2007/0078562 A1 Apr. 5, 2007

Related U.S. Application Data

(60) Provisional application No. 60/723,047, filed on Oct. 3, 2005.

(51) Int. Cl.
*G06F 17/00* (2006.01)

(52) U.S. Cl. ....................... 700/243; 700/237; 700/242; 700/231; 221/121; 221/122

(58) Field of Classification Search ......... 221/1–312 C; 700/231–244
See application file for complete search history.

(56) References Cited

U.S. PATENT DOCUMENTS

| | | | | |
|---|---|---|---|---|
| 4,114,965 A | | 9/1978 | Oye | |
| D273,906 S | | 5/1984 | Norlin | |
| 4,498,603 A | * | 2/1985 | Wittenborg | 221/76 |
| 4,695,954 A | | 9/1987 | Rose et al. | |
| 4,785,969 A | | 11/1988 | McLaughlin | |
| 5,014,875 A | * | 5/1991 | McLaughlin et al. | 221/2 |
| 5,139,321 A | | 8/1992 | Beardsley | |
| 5,152,422 A | | 10/1992 | Springer | |
| RE34,171 E | | 2/1993 | Romick | |
| 5,313,393 A | * | 5/1994 | Varley et al. | 705/28 |
| 5,445,294 A | | 8/1995 | Gardner | |
| 5,460,294 A | | 10/1995 | Williams | |
| 5,522,525 A | | 6/1996 | McLaughlin et al. | |
| 5,536,084 A | | 7/1996 | Curtis | |
| 5,564,593 A | * | 10/1996 | East, Sr. | 221/3 |
| 5,673,983 A | | 10/1997 | Carlson | |
| 5,743,607 A | | 4/1998 | Teufel | |
| 5,745,366 A | | 4/1998 | Higham | |
| 5,805,075 A | * | 9/1998 | Carlson et al. | 312/215 |
| 5,805,456 A | | 9/1998 | Higham | |
| 5,905,653 A | | 5/1999 | Higham | |
| 5,927,540 A | | 7/1999 | Godlewski | |
| 5,971,594 A | | 10/1999 | Sahai et al. | |

(Continued)

*Primary Examiner*—Gene Crawford
*Assistant Examiner*—Michael K Collins
(74) *Attorney, Agent, or Firm*—Clark A. Puntigam; Jensen & Puntigam, P.S.

(57) ABSTRACT

The medication apparatus includes a mobile housing assembly and a plurality of tray members supported therein for rotation on a central mounting assembly. A lockable access door is present in the housing assembly for controlled access to the trays. A tray locking assembly locks and unlocks the trays individually in a plurality of angular positions so that each of the compartments on a particular tray member can be presented before the door. A drive assembly selectively engages and rotates each tray individually when the tray is unlocked. A control system, including a stored program, identifies a compartment associated with a particular patient or associated with particular medications, unlocks the tray associated with the desired compartment, and rotates the tray to present the compartment before the access door, which is then unlocked and openable.

13 Claims, 5 Drawing Sheets

U.S. PATENT DOCUMENTS

| | | | | |
|---|---|---|---|---|
| 6,011,999 | A | 1/2000 | Holmes | |
| 6,039,467 | A | 3/2000 | Holmes | |
| 6,109,774 | A | 8/2000 | Holmes | |
| 6,170,929 | B1 | 1/2001 | Wilson | |
| 6,175,779 | B1 | 1/2001 | Barrett | |
| 6,378,963 | B1 | 4/2002 | Relyea | |
| 6,511,138 | B1 | 1/2003 | Gardner | |
| 6,604,019 | B2 * | 8/2003 | Ahlin et al. | 700/231 |
| 6,636,780 | B1 * | 10/2003 | Haitin et al. | 700/236 |
| 6,640,159 | B2 | 10/2003 | Holmes | |
| 6,655,545 | B1 * | 12/2003 | Sonneborn | 221/7 |
| 6,760,643 | B2 | 7/2004 | Lipps | |
| 6,775,591 | B1 | 8/2004 | Shoenfeld | |
| 6,785,589 | B2 | 8/2004 | Eggenberger et al. | |
| 6,975,922 | B2 | 12/2005 | Duncan | |
| 6,985,797 | B2 | 1/2006 | Spano, Jr. | |
| 6,996,455 | B2 | 2/2006 | Eggenberger | |
| D518,267 | S | 3/2006 | Arceta | |
| 7,040,504 | B2 | 5/2006 | Broadfield | |
| 7,044,569 | B1 | 5/2006 | Relyea | |
| 7,052,097 | B2 | 5/2006 | Meek, Jr. | |
| 7,086,198 | B2 * | 8/2006 | Hayden | 47/41.01 |
| 7,228,200 | B2 * | 6/2007 | Baker et al. | 700/236 |

* cited by examiner

MOBILE MEDICATION STORAGE AND DISPENSING APPARATUS

PREVIOUS APPLICATION

The application claims the priority of provisional application No. 60/723,047, filed on Oct. 3, 2005, titled: Mobile Medication Storage and Retrieval Mechanism.

TECHNICAL FIELD

This invention relates generally to mobile medication-dispensing apparatus, such as used at a patient's bedside in a hospital or similar facility and more specifically concerns such an apparatus which permits access to a single, pre-selected medication compartment from a plurality of possible compartments for each dispensing operation.

BACKGROUND OF THE INVENTION

Mobile medication storage and dispensing apparatus, used by a nurse or other medical practitioner at a patient's bedside in a hospital or similar facility, are generally known. Such apparatus, often referred to as a mobile medication cart, delivers patient-specific medications at the patient's bedside, where they are administered by the nurse. These carts have been popular with hospitals and long-term care facilities for storing patient medications in individual patient compartments within the cart.

In addition, stationary medication cabinets are also known, which are typically used in hospitals for secure storage of narcotics and other drug-specific medications, typically widely used medications, in the nursing unit, outside of the pharmacy.

It is desirable to have a medication cart which is mobile, efficient, easily accessible and convenient to use, in addition to conveniently limiting access to a single unit of use present in one pre-selected compartment per dispensing operation in order to prevent errors as well as theft. A compartment can also be used to hold a single narcotic item, multiple doses of the same item, for instance, aspirin or several patient-specific medications that will be used over a given time period, such as four hours.

The problems with mobile medication carts available in the market today include a failure to limit access to one drawer or compartment per dispensing operation and a failure to satisfy narcotic storage regulation. Further, they do not have the required capacity for all of the patient's medication needs, while remaining mobile. Still further, many such known carts are not electronically controlled by medication safety software while in use at the patient's bedside.

Stationary cabinets also have problems, in addition to lack of mobility, in that many such devices do not have medication safety software, and require proprietary access software, which is often slow and problematic to retrieve narcotics and other medications.

There remains a basic need for a mobile cart, which is easy to use and maneuver and which has a significant medication storage and dispensing capability, while at the same time is light and compact, with a minimum footprint.

SUMMARY OF THE INVENTION

Accordingly, the present invention is a mobile medication apparatus, comprising: a mobile housing assembly; a plurality of tray members, supported in a vertical stack within the housing assembly, mounted to be rotatable individually about a central support assembly; a lockable door in the housing assembly for providing selected access to the trays therein; a locking assembly for locking and unlocking the tray members individually; a plurality of compartment members, individually openable, positionable on the individual tray members and rotatable therewith; a central drive assembly, including a motor, for engaging and rotating each tray individually; and a control system, including a stored program, for identifying a selected compartment, located on a particular tray, into and from which medications are stored and retrieved, for unlocking the particular tray containing the selected compartment, for energizing the drive assembly for the one tray to present the selected compartment to the door and for unlocking the door, thereby making the selected compartment available to a user.

BEST MODE FOR CARRYING OUT THE INVENTION

Figure 1:
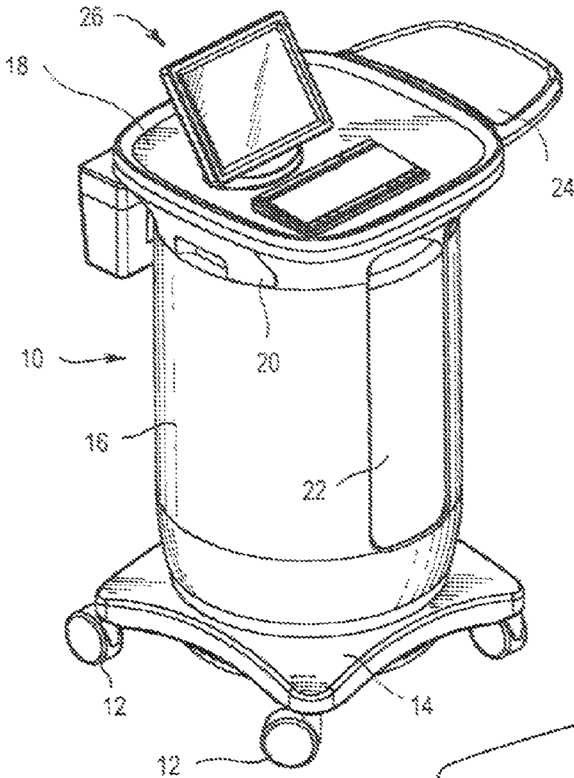
FIG. 1 is a perspective view of the cart of the present invention.

FIG. 1 shows the present mobile computer-controlled medication cart, generally referred to at 10. The medication cart 10 in the embodiment shown is approximately 22 inches wide by 22 inches deep by 39 inches high, and weighs approximately 100 pounds. The cart includes four caster-type wheels 12-12 which are attached to a base member 14, which includes a sheet metal inner structure with a plastic cover overlay. A side (body) portion 16 includes a sheet metal inner assembly, which is shown in more detail in FIG. 2, attached to a base member 1. The body portion includes a plastic cover overlay as well.

A top member 18 is secured to the body portion 16. A miscellaneous supply drawer 20 is positioned beneath top member 18, housed within a 6-inch space between top member 18 and body portion 16. The body portion further includes a locking door 22 which is either hinged to open or is constructed to slide open on guides which are attached to the body portion 16. A folding work surface 24 is attached by hinges to top member 18, and in the embodiment shown is made from plastic. Positioned on top member 18 are computer peripherals, shown generally as a group at 26, which can include a standard monitor, a mouse, a keyboard, a fingerprint reader and a barcode scanner. Other peripheral equipment could be included as well.

Figure 2:
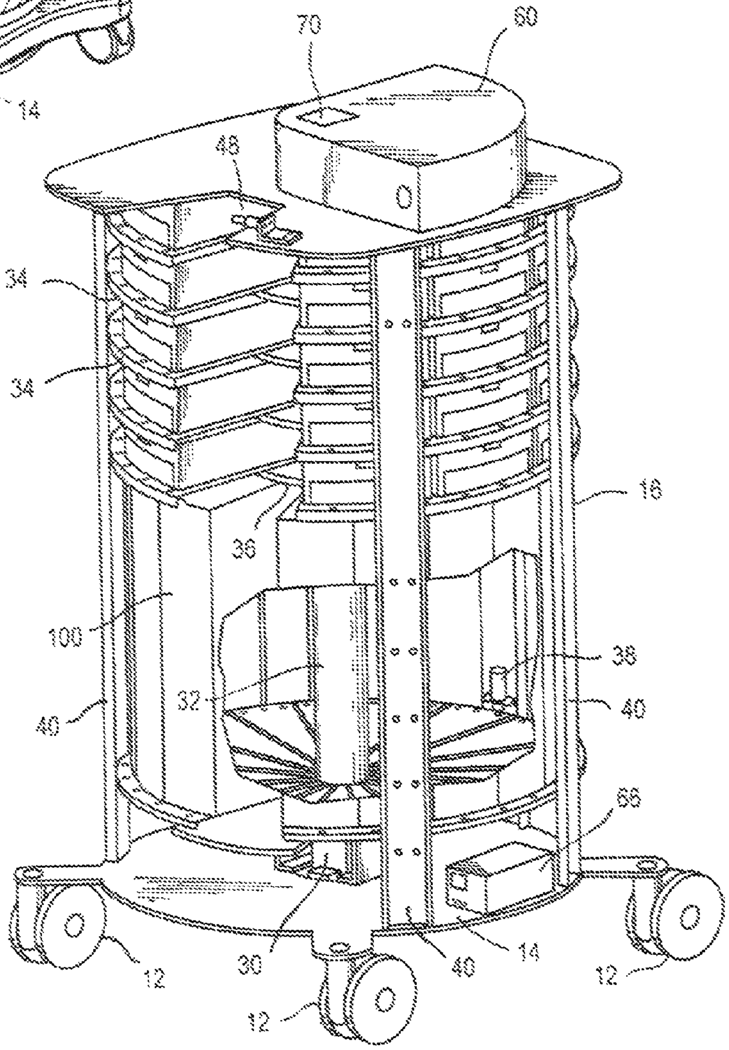
FIG. 2 is an elevational view of a portion of the internal assembly of the cart of FIG. 1.
Figure 3A:
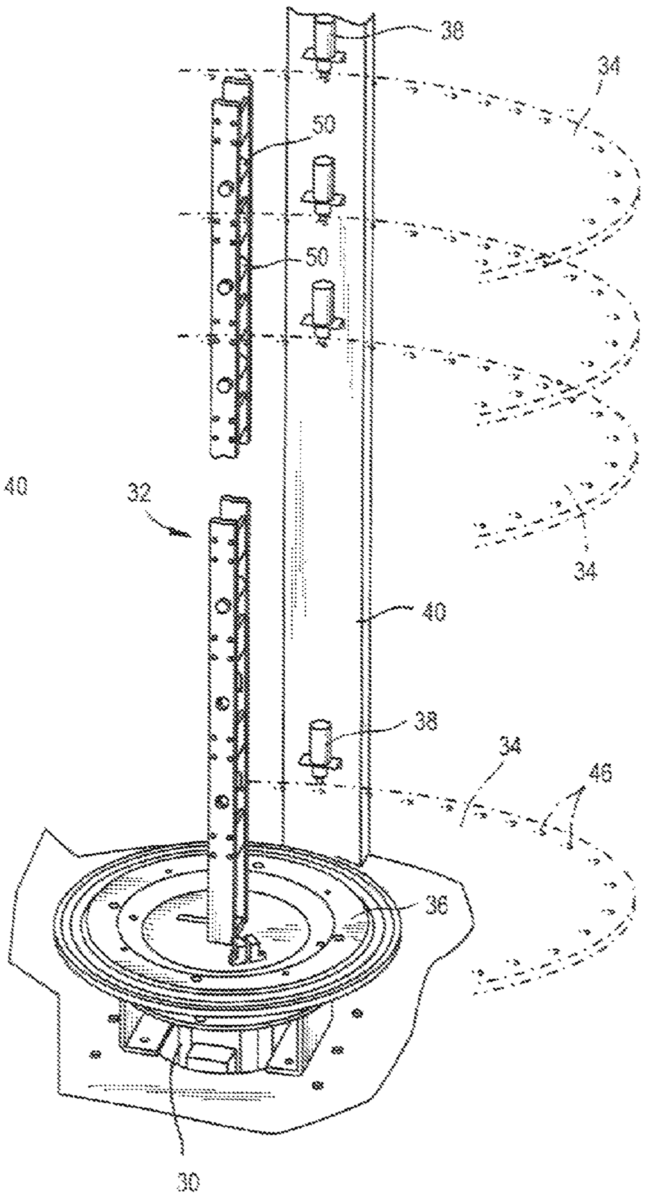
FIGS. 3A and 3B are elevational views of portions of the internal assembly of the cart.
Figure 3B:
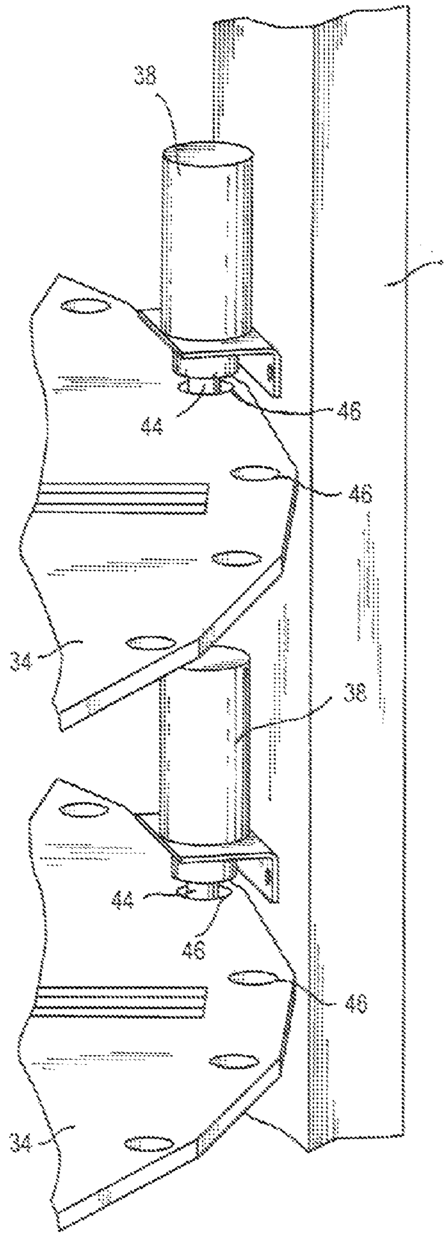
Figure 4:
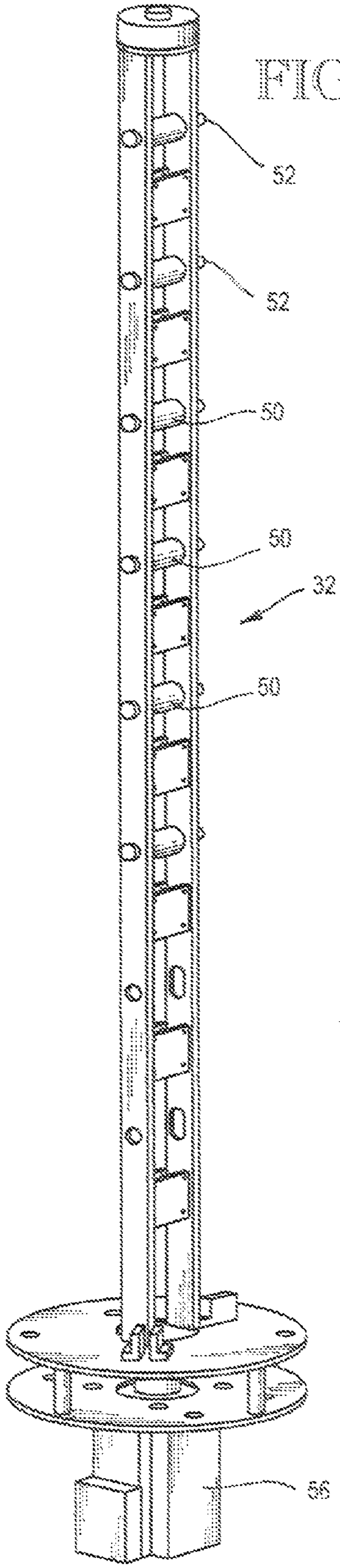
FIG. 4 is an elevational view showing the center solenoid tray drive mechanism of the apparatus of FIGS. 1-3.

The cart 10 is shown in more detail in FIGS. 2-6. FIG. 2 is an elevational view of the internal structure of the medication storage and retrieval cart 10. A vertical mounting assembly 22 (FIGS. 3A, 4) which supports a plurality of plastic trays 34-34 arranged in vertical alignment is secured to base member 14 by a coupling assembly 30. Each plastic tray 34 is mounted on a separate turntable bearing assembly 36 to provide independent rotational movement for each tray. Each tray has associated therewith a solenoid tray lock 38 which is mounted to one of a plurality of vertical support members 40-40 in the body portion of the cart. In the embodiment shown, there are five equally spaced vertical support members 40 which are connected both to the base member 14 and top member 18. The vertical support elements are approximately 2 inches wide and 29 inches high and are made of machined aluminum.

The plunger portion 44 of each solenoid tray lock 38 in its de-enlarged position fits into an opening 46 in its associated tray at the periphery thereof, thereby locking the tray in place until the tray is unlocked at 9° intervals in the embodiment shown to permit the tray to be locked in a plurality of rotational positions.

The cart includes a solenoid door lock 48 which is mounted to the top member and locks/unlocks door 22.

The vertical mounting assembly 12 (FIGS. 3A and 4) extends upwardly through the center of the cart. The individual trays 34-34 are rotatably mounted to mounting assembly 32 by the turntable bearing assemblies 36. The mounting assembly 32 includes a plurality of tray drive solenoids 50, mounted respectively at the height of each tray. In the de-energized position of the solenoid 50, plunger portion 52 thereof is in a retracted position. When a selected tray is to be rotated, the solenoid 50 associated with that selected tray is activated by a system control assembly 60 and the plunger portion for that tray moves to its extended position, engaging an opening 54 (FIG. 5) in the inner periphery of the selected tray. When the vertical mounting assembly 32 is rotated by action of drive motor 6, the selected tray moves therewith.

The electronic system control assembly 60 on the cart, also referred to as the controller, includes a software program for operation of the cart. The program is routine and is therefore not described in detail. The electronic system control assembly further includes required fuses, relays, power converters, power supplies, transformers, power cords and other miscellaneous standard components necessary for computer-controlled cart operation.

The cart 10 is powered by batteries 66 that are mounted at the bottom of the cart and provide the cart with ballast as well as electrical power.

A vent 70 is positioned in the top member 18 of the cart to allow for heat to dissipate out of the cart. Heat from the drive mechanism, which is mounted at the lower center of the storage and retrieval cart, rises up the vertical mounting assembly into the electronics compartment housing the system control assembly and dissipates through vent 70.

Figure 5:
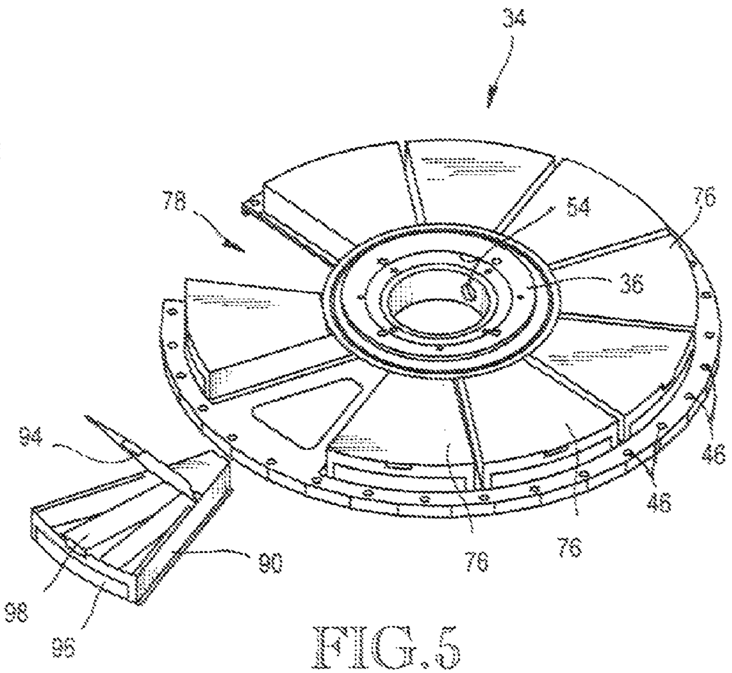
FIG. 5 is a perspective view showing one medication tray arrangement for the cart of FIG. 1.

FIG. 5 shows a standard container tray 34 with a plurality of separate standard container members or compartments 76-76. Each tray includes one open sector 78 which is in registry with the cart door 22 when the tray 34 is in its home position. The tray 34 is made out of plastic and includes a plurality of openings 46 around and close to the peripheral edge thereof, to receive a plunger from its associated solenoid to lock the tray in various angular positions. As discussed above, each tray is mounted on a turntable bearing 36 to provide for rotation of the tray. The plurality of openings 46 positioned around the periphery of the tray, located in the embodiment shown at 9° increments, provide precise positioning of the containers relative to the cart door, although other angular increments can be used.

Each container member 76 is removable from the tray, and guide rails 90 on the bottom edge of the container help the user to position the container on the tray. The containers 76 are maintained in place on the tray with an interference fit. Each container has a lid 94 which can be lifted/removed by the user for access to the medications in the container. An interference fit between the lid and the body of the container keeps the lid in a normal closed condition.

In one embodiment, a barcode 96 can be used on the container to uniquely identify each container. Further, plastic dividers 98 can be used within a container to subdivide a container into a plurality of smaller regions.

The containers of FIG. 5 are for patient-specific medications or specific drugs, including medications of general use. The containers can be subdivided to increase the number of drug-specific items stored on the cart or to store single narcotic items for improved tracking and control.

Figure 6:
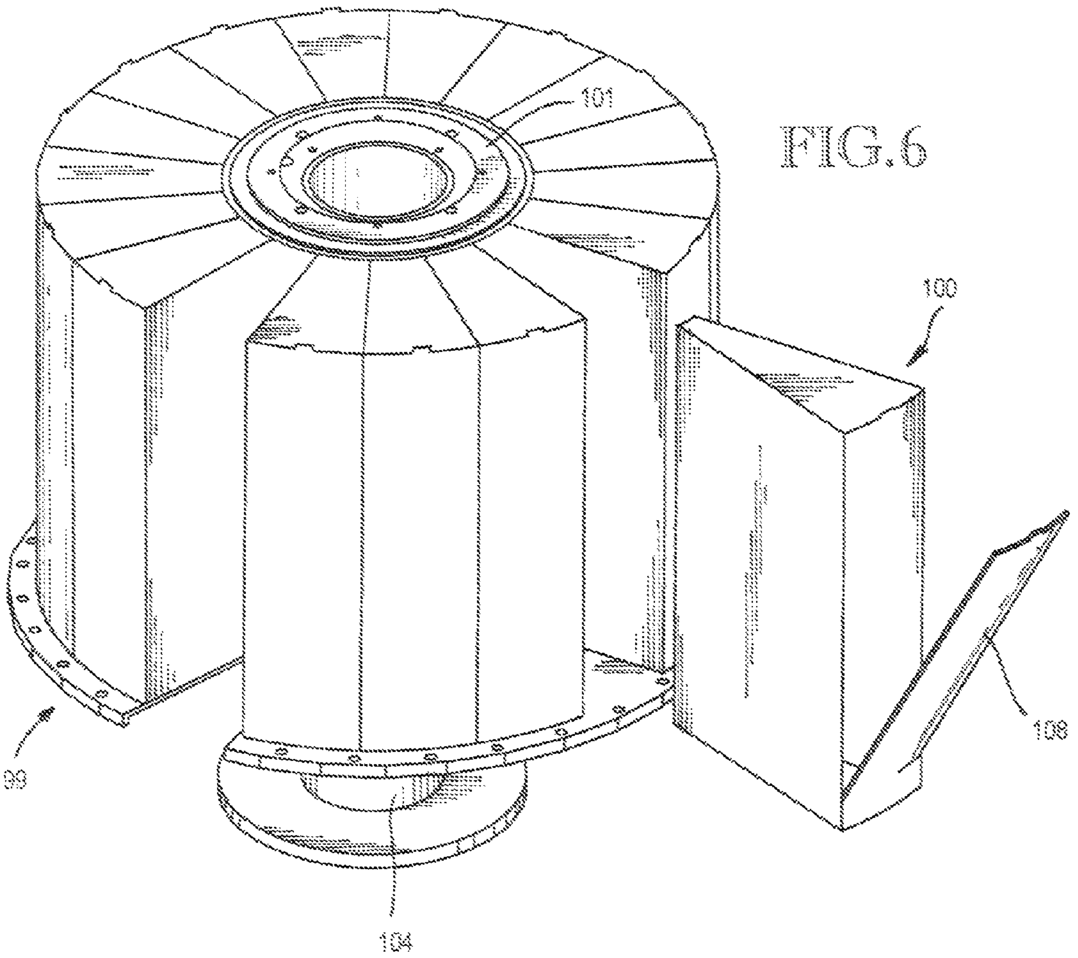
FIG. 6 is a perspective view showing another tray arrangement for the cart of FIG. 1.

FIG. 6 shows of tray 99 with large containers 100 which can be positioned at the lower end of the body portion of the cart, as illustrated in FIG. 2. The large container tray 99 is mounted by turntable bearings 101 to the central mounting assembly to provide independent rotation thereof. Coupling 104 maintains an offset of the large containers from the bottom of the cart so as to provide room for the cart batteries. Each large containers 100 in the embodiment shown has a plastic door 108 which is arranged with an interface fit to maintain the door closed relative containers includes a plurality of openings engageable by a tray-locking solenoid 38 associated therewith to precisely position each container on the tray relative to the door of the cart. The large containers 100 are used to house larger items such as PCA syringes, IV piggybacks and multiuse items such as eye drops.

Figure 7A:
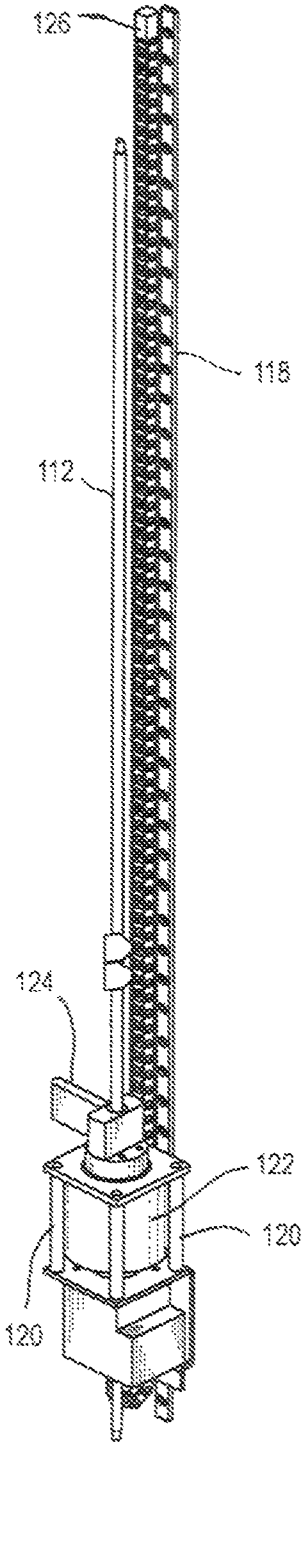
FIGS. 7A and 7B are perspective views showing an alternative embodiment of the cart apparatus of FIG. 1.
Figure 7B:
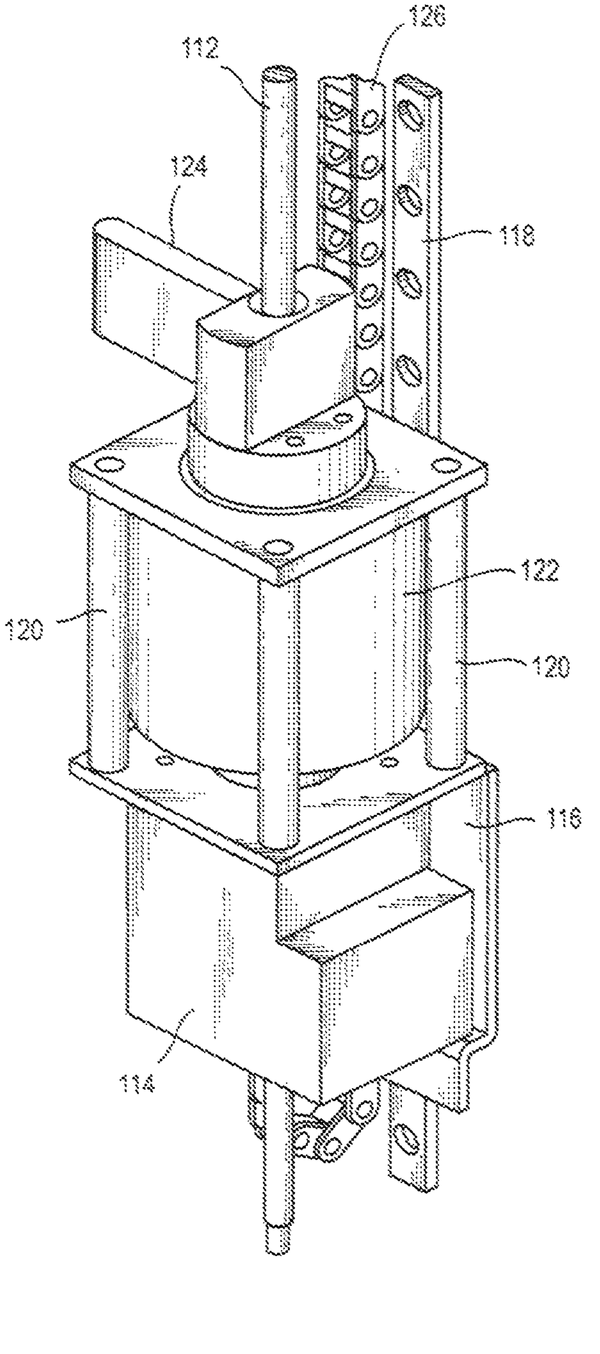

FIGS. 7A and 7B show an alternative embodiment. In this embodiment, the mating assembly includes a lead screw 112 with a lead screw motor 114. The lead screw motor 114 is attached to a bearing guide bracket 116 that is secured to a bearing rail 118. Standoff elements 120-120 attach a hollow shaft motor 122 to the bearing guide bracket 116. At the top of the assembly is a tray drive engagement key 124 that fits into an opening in the tray to rotate the tray. Bearing rail 118 provides structural rigidity to the drive assembly, and an associated cable guide 126 ensures that wires carrying control signals do not interfere with any moving parts of the assembly.

The following paragraphs describe the operation of the cart, beginning with loading the cart with patient-specific medications.

In the pharmacy at the beginning of the process, a pharmacy technician selects a patient by means of a handheld computer. The technician then scans an available container's bar code to associate that particular container with the patient. A list of all the patient's medications required for the dosing interval are displayed to the technician. The technician gathers each required medication, scans the bar code to the verify the correct medication and dose and then places the medication into the patient's container. This step is repeated for each required medication.

In the next step, the pharmacy technical delivers the pre-loaded containers to the cart located at the nursing ward. The technical selects the patient container swap function. The controller on the cart then will request a fingerprint authorization/authentication from the technician. The technician uses the fingerprint reader on top of the cart for authentication. The technician then scans the container's barcode. The computer locks up the room/bed designation the location of the patient's previous dosing container (if any).

The controller then energizes the particular tray drive solenoid associated with the correct tray having the container, thereby connecting the central solenoid tower assembly to the correct tray. The controller then energizes the tray lock solenoid to unlock the correct tray. The controller then energizes the motor to rotate the central solenoid tower and hence the correct tray so as to position the patient's previous container at door 22. The controller then de-energizes the solenoid tray lock 38, which results in locking the correct tray in place. The controller then energizes the door lock 48 to unlock the door 22.

The technician then removes the previous container which is to be swapped, after opening the access door of the cart. The technician then inserts the new container into the tray. The technician then closes the access door.

The controller then is used to de-energize the access door lock in order to lock the access door. The controller then energizes the tray lock solenoid associated with the tray to unlock the tray. The controller next energizes the tray drive solenoid associated with the tray and then energizes the tray drive motor to rotate the center assembly and the tray to its home position. The tray lock solenoid is then de-energized to lock the tray in place.

The above sequence of functions is then repeated for each patient having medications which are to be present in the cart.

A similar process is used to store commonly used medications and narcotics in either the standard containers or the larger containers. These particular storage locations are static, i.e. they are never removed from the tray. Typically, stock medications and narcotics are assigned a maximum quality and reorder quantity. When the actual quantity of the common concerning replacement is automatically sent to the pharmacy. Relative to the sequence described above, at the point when the access door is unlocked, the bar code on the medication is scanned and the medication is then placed in the container. This step is repeated until the maximum quantity is reached. The entire sequence is then repeated for each medication.

The following sequence of operation concerns the dispensing operation for medications for a particular patient at the patient's bedside. In typical operation, a nurse of other medical professional will use the retrieval (dispensing) function of the cart at the patient's bedside to access all medications for a particular patient safely and securely.

The following sequence of operation concerns the dispensing operation for medications for a particular patient at the patient's bedside. In typical operation, a nurse or other medical professional will use the retrieval (dispensing) function of the cart at the patient's bedside to access all medications for a particular patient safely and securely.

First, the nurse will identify the patient, using the cart's barcode scanner to scan the patient's wristband. The cart controller then requests fingerprint authorization. The nurse will then use the fingerprint reader on the cart for authorization. The cart's computer display screen will then display the patient's pharmacy treatment orders for review by the nurse. The nurse will then select the pharmacy treatment order to administer to the patient. The cart controller then determines which container (and the correct tray) in the cart has the requested medications to fulfill the treatment order.

The tray drive solenoid is energized to engage the correct tray and the tray lock solenoid associated with the correct tray is then energized to unlock the tray, freeing the tray for rotational movement. The solenoid tower assembly motor then rotates the correct tray via the engaged tray drive solenoid to position the selected container (either standard or large) having the desired medication behind the access door.

The controller then de-energizes the tray lock solenoid, to lock the tray in place. The door lock solenoid is then energized to unlock the access door. The nurse will then remove the medication from the presented container and scan the medication barcode to verify the medication and the correct dose. This step is repeated until the nurse has obtained maximum dose quantity.

The nurse then closes the access door 22 and the controller de-energizes the access door solenoid to lock the access door 22. The controller then energizes the correct tray lock solenoid to unlock the tray, energizes the tray drive solenoid for the tray, and then energizes the drive motor to rotate the tray to return it to its home position. The controller then de-energizes the tray lock solenoid to lock the tray in its home position. The nurse next documents the medication-administration event in the cart computer. The above steps, starting at the identification of the particular patient, are repeated for each pharmacy order.

It should be understood that the above-described structure is one embodiment of the overall apparatus. The computer peripherals 10 can also include laptop computers, tablet personal computers, personal digital assistance device or any other common computer equipment. Additional compartments can be mounted to the cart in open spaces of the apparatus. The lid for the standard container can also be configured to open from the side. Although the embodiment refers to solenoid-type control devices, other control devices could be used.

Although a preferred embodiment of the invention has been disclosed here for the purposes of illustration, it should be understood that various changes, modifications and substitutions may be incorporated in the embodiment without departing from the spirit of the invention, which is defined by the claims which follow.

What is claimed is:

1. A mobile medication apparatus, comprising:

a mobile housing assembly;

a plurality of tray members, supported in a vertical stack within the housing assembly, wherein the housing assembly substantially surrounds and is substantially separate from the tray members, all tray members mounted to be rotatable individually, separately from each other, about a single central support assembly which extends through all the tray members;

a single lockable door in the housing assembly for revealing when opened a portion of all of the tray members at once;

a locking assembly for locking and unlocking the tray members individually;

a plurality of compartment members, individually openable, positionable on the individual tray members and rotatable therewith;

a central drive assembly, including a motor, for engaging and rotating each tray member individually; and a control system, including a stored program, for providing authorized use of the medication apparatus, for identifying and accessing a selected compartment member, located on a particular tray member, into and from which medications are stored and retrieved, for unlocking the particular tray member containing the selected compartment member, for energizing the drive assembly for the particular tray member to move the tray member to a position in which the selected compartment member is presented to the door, for locking the tray member in said position and for subsequently unlocking the door, thereby making the selected compartment member available to a user, wherein the tray members and/or the compartment members thereon are arranged and configured such that the selected compartment member is the only compartment member available to the user that has medications therein when the door is opened, wherein the tray members other than the particular tray member are in a home position, without any compartments thereon containing medications being available.

2. The apparatus of claim 1, wherein the locking assembly includes a plurality of tray locking solenoid members, each tray locking solenoid member mounted and operable to lock an associated tray member at a plurality of angular positions.

3. The apparatus of claim 2, wherein the central drive assembly includes a tower member and a plurality of tray drive solenoids mounted on the tower member for engagement, respectively, with each tray member, and wherein the control assembly includes means for energizing the tray drive solenoid associated with the tray member containing the selected compartment member.

4. The apparatus of claim 1, including means for entering identifying information for a patient, wherein the stored program identifies the compartment members having medications selected for said patient.

5. The apparatus of claim 1, wherein the housing assembly is supported by wheels so that it is moveable.

6. The apparatus of claim 1, wherein the compartment members each have a lid with an interference fit with the remainder of the compartment member, and wherein the compartment members have an interference fit with the tray member on which they are positioned.

7. The apparatus of claim 1, wherein the control drive system includes a stepper motor and encoder, or a servo drive system, for rotating the tray member through a selected number of angular movements of known magnitude.

8. The apparatus of claim 1, wherein each of the tray members has an open sector which is presented to the door when the tray member is in its home position, such that there is no access to the compartment members on any of the tray members other than the selected compartment member on the particular tray member.

9. The apparatus of claim 3, wherein each tray locking solenoid member is engaged with its associated tray member except when the tray member is to be rotated, and each tray drive solenoid is disengaged from its associated tray member unless the tray member is to be rotated during operation of the drive system.

10. The apparatus of claim 1, wherein the apparatus is powered by a battery, which is positioned at the bottom of the housing assembly, providing a stable ballast for the apparatus.

11. The apparatus of claim 1, wherein the apparatus includes two different kinds of compartment members, one compartment member being arranged and configured for patient-specific or drug-specific medications, the other compartment member being significantly larger, to house larger items.

12. The apparatus of claim 11, wherein the one compartment member is subdividable.

13. The apparatus of claim 1, wherein the compartment members are not lockable.

* * * * *